United States Patent [19]

Driels

[11] Patent Number: 4,842,475

[45] Date of Patent: Jun. 27, 1989

[54] COMPUTER CONTROLLED ADAPTIVE COMPLIANCE OF ASSEMBLY WORKSTATION

[75] Inventor: Morris R. Driels, W. Kingston, R.I.

[73] Assignees: Board of Governors for Higher Education, State of Rhode Island; Providence Plantations, both of Providence, R.I.

[21] Appl. No.: 60,942

[22] Filed: Jun. 9, 1987

Related U.S. Application Data

[63] Continuation of Ser. No. 686,605, Dec. 27, 1984, abandoned.

[51] Int. Cl.⁴ .............................................. B66C 1/00
[52] U.S. Cl. ............................... 414/730; 901/8; 901/45
[58] Field of Search ............... 901/4, 6, 8, 9, 15, 901/41, 45, 46, 49; 414/222, 225, 730, 735; 269/23

[56] References Cited

U.S. PATENT DOCUMENTS

| | | | |
|---|---|---|---|
| 3,906,325 | 9/1975 | Salmon | 901/46 X |
| 4,042,161 | 8/1977 | Ando | 901/46 X |
| 4,243,923 | 1/1981 | Whitney et al. | 901/15 X |
| 4,260,941 | 4/1981 | Engelberger | 901/9 X |
| 4,266,905 | 5/1981 | Birk et al. | 901/45 X |
| 4,445,273 | 5/1984 | Van Brussel et al. | 901/9 X |

FOREIGN PATENT DOCUMENTS

| | | | |
|---|---|---|---|
| 43208 | 1/1982 | European Pat. Off. | 901/15 |
| 3038436 | 5/1982 | Fed. Rep. of Germany | 414/730 |
| 0636076 | 12/1978 | U.S.S.R. | 901/9 |
| 2058407 | 4/1981 | United Kingdom | 901/9 |

Primary Examiner—Robert J. Spar
Assistant Examiner—William M. Hienz
Attorney, Agent, or Firm—Samuels, Gauthier, Stevens & Kehoe

[57] ABSTRACT

An adaptive compliance system wherein the movement of an orientation station is controlled in combination with its interaction with an assembly robot to vary the stiffness between the two structures.

5 Claims, 6 Drawing Sheets

COMPUTER CONTROLLED ADAPTIVE COMPLIANCE OF ASSEMBLY WORKSTATION

"This is a continuation of co-pending application Ser. No. 686,605 filed on Dec. 27, 1984," now abandoned.

BACKGROUND AND BRIEF SUMMARY OF THE INVENTION

This invention is directed to the automatic assembly of products by robots. Robots such as single arm robots are used for manipulation of workpieces, see for example U.S. Pat. Nos. 4,305,130 and 4,402,053 and the patents cited therein. A robot's efficiency is improved by the use of unique hands (see U.S. Pat. Nos. 4,266,905 and 4,466,768 and/or wrists. However, it is believed that current trends towards more intelligent single arm assembly stations may be inappropriate both from a complexity and cycle time for assembly required with single arm assembly.

In our invention two new approaches to the assembly workcell specification and operation are used. A large number of parts are handled by many robots, the mechanical design of which makes these robots inexpensive to manufacture. The lack of manipulative capability of these robots is compensated for by a relatively sophisticated re-orientation station on which the assembly is constructed. A further feature of the invention, known as adaptive compliance, will allow assembly tasks to be performed faster than is achievable at the present time.

Assembly of workpieces to form a product is a complex task both in terms of the type of components (workpieces) that are mated and the range of dexterity required. Parts may vary in weight from several pounds to fractions of an ounce, while insertion processes range from a unidirectional fixed position motion to a change in all six degrees of freedom of the part while simultaneously controlling forces/torques in the same degrees of freedom.

Several approaches exist for solving the general assembly problem, none of which have yet been proven successful for all, or even a majority of assembly tasks.

Part feeding is typified by that of Boothroyd (Boothroyd et al, *Handbook of Feeding and Orienting Techniques for Small Parts*, Department of Mechanical Engineering, University of Massachusetts; Boothroyd et al, *Parts Presentation and Feeding for Robot Assembly*, An. CIRP, Dec. 1982, p. 377) and consists of transforming the orientation of the part from a random state to a known state by an orientation mechanism. This mechanism may or may not be adaptable to a range of parts, but one is needed for each part involved in the assembly. In such a scheme, the manipulator performing the assembly task can be relatively simple since the part acquisition is essentially a fixed stop mode of operation. This blending of robotics and hard automation has been criticized for being somewhat inflexible.

Design for manufacture is an increasingly important area where the overall design of a component is reviewed with a view to making it easier to automate the assembly of that component (Delisser et al, *Analysis of Product Designs for Ease of Manual Assembly—A Systematic Approach*, Report No. 17, Dept. of Mechanical Engineering, University of Massachusetts; Boothroyd, G., *Design for Producibility*, Assembly Engineering, Mar. 1982, pp. 42-45). It is perhaps naive to expect that a dated design, which demands considerable dexterity on the part of the manual assembler, can be easily transferred to an automated assembly environment. In few cases is this even impossible due to the complexity of the device, but even in instances where it may be possible, it may not be desirable in view of the extensive development costs involved. Ideally, the requirement to automate an assembly process should involve a redesign of that component based on a preliminary concept of the automatic assembly workstation. This is obviously an iterative process since major redesign simplifies the assembly but may not be possible for other reasons. Even if unconstrained redesign is allowed, this only simplifies the overall problem, it does not solve it. The product will still have to be assembled.

In selective assembly using industry standard techniques, a generic assembly sub-task can be studied and tested to a high degree of reliability. Examples are inserting a peg into a hole (Defazio, T.L. et al, *Feedback in Robotics for Assembly and Manufacturing*, Final Report Grant No. DAR-7918530, Charles Stark Draper Laboratory, Inc., Cambridge, MA 1982; (see also U.S. Pat. Nos. 4,156,835 and 4,243,920) Ando et al, *Current Status and Future of Intelligent Industrial Robots*, IEEE Trans. Industrial Electronics, Vol. IE-30 No. 3, Aug. 1983, pp. 291-299), the handling of flexible components (Palm et al, *Automated Assembly Involving Flexible Tubes*, Proc. 15th CIRP Int. Seminar on Manufacturing Systems, Amhurst, MA, June 1983; Palm et al, *A Case Study of a Flexible Part Assembly Problem*, Robotics Research Center IPP Report No. 24, University of Rhode Island, Sept. 1983) and the insertion of well defined electronic components using open loop methods (Leonida, G., *Handbook of Printed Circuit Design, Manufacture, Components and Assembly*, Electrochemical Publications Ltd., Anchor Press, U.K. 1981). Although such methods are both well understood and reliable, they only help to solve part of the problem, in that the other aspects of assembly not addressed by such techniques are presumably left to manual or unspecified procedures. Only when a more extensive repertoire of generic sub-tasks has been solved will it be possible to expect complete assemble functions to be handled by this method alone.

The use of robots in assembly processes has been considerable in the last few years. In particular research into various aspects of sensor technology has enabled robot to interact, in an intelligent manner, with its environment. Typically, research in vision systems (Birk et al, *General Methods to enable Robots With Vision to Acquire, Orient and Transport Workpieces*, 8th Report Grant No. DAR 7827337, University of Rhode Island, Dec. 1982; Taylor et al, *Closed Loop Control of an Industrial Robot Using Visual Feedback From a Sensory Gripper*, 12th ISIR L'Association Francaise de Robotique Industrielle, Paris, June 1982, pp. 79-86), force sensing (Driels et al, *Force Sensing Hand for Small Part Assembly*, Robotics Research Center IPP Report No. 28, University of Rhode Island, Sept. 1983; Inoue, H., *Force Feedback in Precise Assembly Tasks*, Memorandum No. 308, MIT AI Laboratory, 1974), tactile sensing (Severwright, J., *Tactile Sensor Arrays—The Other Option*, Sensor Review, Jan. 1983, pp. 27-29; Driels et al, *Interfacing of a Compliant Tactile Sensor Pad*, Robotics Research Center IPP Report No. 22, University of Rhode Island, Aug. 1983) and the integration of such systems (Tella, R., *A Robot System To Acquire, Orient and Transport Plastic Bottles to a Process Line*Robotics Research Center IPP Report No. 18, University of Rhode Island, August 1983; Datseris et al, *A Robot System for Handling and High Density Packaging of Plastic Trays*, Robotics Research Center IPP Report No. 16, University of Rhode Island, May 1983) has allowed an increased number of assembly tasks to be undertaken. This may be thought of as a type of generic assembly task since, for example, not everything can be assembled by a robot with a vision system alone. The same line of reasoning has, however, led research groups to believe that the development and scope of sensor technology is such that enough generic sub-tasks have already been solved to construct the general purpose robot assembly tool. This approach has been taken, for example, by the ITAS group (Benton et al, *Intelligent Task Automation*, Report No. 2, Air Force Wright Aero. Lab., Wright-Patterson AFB, Ohio, July 1983) and the University of Rhode Island (Driels, M., *The Investigation of the Assembly of Non-Standard Electrical Components Using Robotic Devices*, Proposal submitted to Industrial Participation Program, Robotics Research Center, University of Rhode Island, Oct. 1983).

It appears at the present time that no one prior art technique will solve all assembly problems but that a combination will be needed. Part feeders of some form will be required but perhaps not as complex as current state-of-the-art machines, since we can delegate some intelligence to the assembly robot. Redesign of existing components and design constraints placed on new components will also help in their final assembly operations. However, since both of these activities occur prior to assembly, the central problem of how assembly is performed is not addressed.

In addressing the general problem of assembling products comprising a large number of workpieces, two specific approaches are used. One considers the specification of the complete workcell environment rather than concentrating on a particular component such as a robot or type of sensor system. The principle used in mechanical design known as problem inversion is applied and results in a redistribution of manipulative capability within the workcell in such a manner as to make the complete hardware configuration required for the solution economically competitive.

The second approach, closely linked with the first, investigates a method for considerably speeding up the process of insertion which for many robot assembly schemes may be the factor which has most effect on overall cycle time.

In the ideal situation where one robot is responsible for handling one workpiece, its function can be specified as follows:

1. Acquire the workpiece and determine its orientation in the gripper.
2. Transfer the workpiece to the workspace and then manipulate it to the appropriate location on the partly completed assembly.
3. Identify the location of landing site and, using force control, insert the part.

Much of the cost of conventional manipulators is associated with steps 2 and 3 above, since the first step can be considered to be chiefly a function of the end effector. As a result the duplication of these capabilities in each manipulator is a major factor in the high capital cost of multi-arm assembly workstations.

If the complex manipulative capability is removed from each robot and placed at the assembly (orientation) station itself the following observations may be made. The nature of the assembly task is essentially unchanged; and the mechanical specifications of the robot change dramatically.

Under such a scheme the manipulators are very limited in terms of their ability to manipulate parts, having perhaps two or three degrees of freedom. After acquiring the workpiece needed in the next stage of assembly, the arm would move to a precise, fixed pose within the workstation. The product being assembled is built up not on a stationary table but on an orientation station capable of sophisticated reorientation of product being assembled. This station then performs the assembly by moving the workpiece while the robot and workpiece remain stationary.

As can be seen, the robot becomes essentially a fixed stop manipulator needing only point-to-point path control, resulting in a device which in terms of cost is an order of magnitude less than conventional robot arms. The system has the following advantages. Assembly stations utilizing multiple arm robot manipulators are economically viable. Sensor systems needed for the assembly/insertion tasks are concentrated at the workstation instead of being duplicated and distributed amongst the individual arms. The overall assembly process is executed much faster since in a single smart arm assembly station the arm has to move out of the workspace, acquire the next part then return to the workspace for the insertion. In the multi-arm environment, the assembly can proceed as soon as the previous arm has cleared the workspace. It may also be possible, under certain circumstances, to waive even this constraint.

Broadly, our invention relates to a robot placing an acquired piece into mating contacting engagement with another workpiece (assembly) secured to a table (orientation station) with more celerity than presently believed achievable with state-of-the-art robots. One aspect of the invention is referred to hereinafter as adaptive compliance. A further aspect of the invention is to use the adaptive compliance concept between a 'dumb' robot and a 'smart' orientation station with several robots in combination whereby several workpieces may be engaged to an assembly to form a final product.

In our invention, a workstation is defined and includes an orientation station and robots, or other programmable assembly machines which are able to construct various products. Six degrees of freedom are specified for the orientation station whereby it may be used in the workstation with a number of relatively simple assembly robots. An adaptive compliance control system constitutes part of an invention and enhances the speed up of the engagement of workpiece component into workpiece.

The adaptive compliance control system regulates the movement of the reorientation station during its interaction with an assembly robot and controls the stiffness between the two machines. This stiffness is critical to the speed of assembly and is controlled by an adaptive computer program. By utilizing a single, sophisticated reorienting workstation, it becomes economically feasible to use simple inexpensive robots, together with the orientation station to produce a multi-robot assembly workstation.

The use of multiple robots within a single orientation station has up until now been prohibitively expensive. By redistributing the manipulative capability within the workstation, many simple robots coupled with a single sophisticated workstation provides an economical solution.

DESCRIPTION OF THE PREFERRED EMBODIMENT OF THE INVENTION

The reorientation station on which the assembly is built up is no more kinematically complex than a conventional manipulator. Preferably, it is designed to make it simpler by, for example, utilizing a commercially available x-y-z table, such as an Anorad Corp. positioning system, for the first three degrees of freedom. The robot arms are also easy to control due to their simplistic geometry in that normally no more than two will be moving at any one time.

The following basic gripper designs and sensor systems can be built which, with obvious modification will be able to handle the majority of workpieces to be assembled.

| Gripper design | Sensor system |
| --- | --- |
| 1. Vacuum cup | 1. Vision (high and low resolution) |
| 2. Parallel jaw | 2. Multi-axis force/torque |
| 3. In-hand manipulator | 3. Tactile Force |
|  | 4. Proximity |

Figure 1:
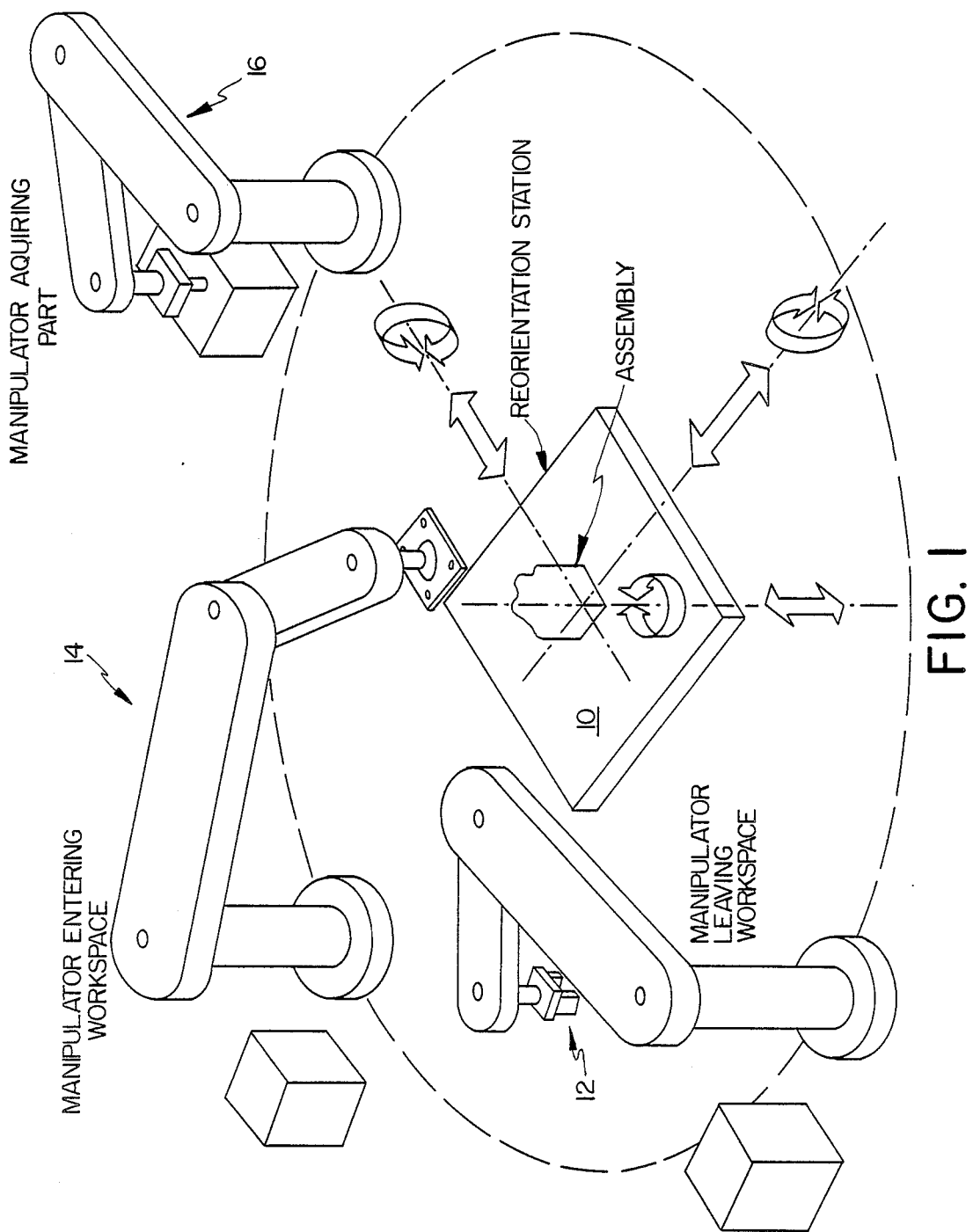
FIG. 1 is a schematic of a workstation.

A typical workstation is shown in schematic form in FIG. 1 and comprises a reorientation station 10 and three robots 12, 14 and 16.

The programming necessary to effect the basic movement of the station 10 and the movement of the robot arms, per se and in sequence is well within the skill of the art.

To compliment the workstation configuration outlined above, the reorientation station is equipped and programmed with a facility which will greatly enhance the speed with which assembly or engagement operations take place, and in the preferred embodiment the engagement is insertion. This facility is called adaptive compliance. In considering the classic assembly problem of inserting a peg into a hole, several solutions are well understood (Mason, M., *Compliance and Force Control For Computer Controlled Manipulators*, IEEE Transactions on Systems, Man and Cybernetics, SMC-11, June 1981, pp. 418–432; Railbert et al, Hybrid Position/Force Control of Manipulators, Trans. ASME J. Dynamic Systems, Measurement and Control, Vol. 102, June 1982, pp. 126–133). All of these rely on force control in one form or another.

Figure 2:
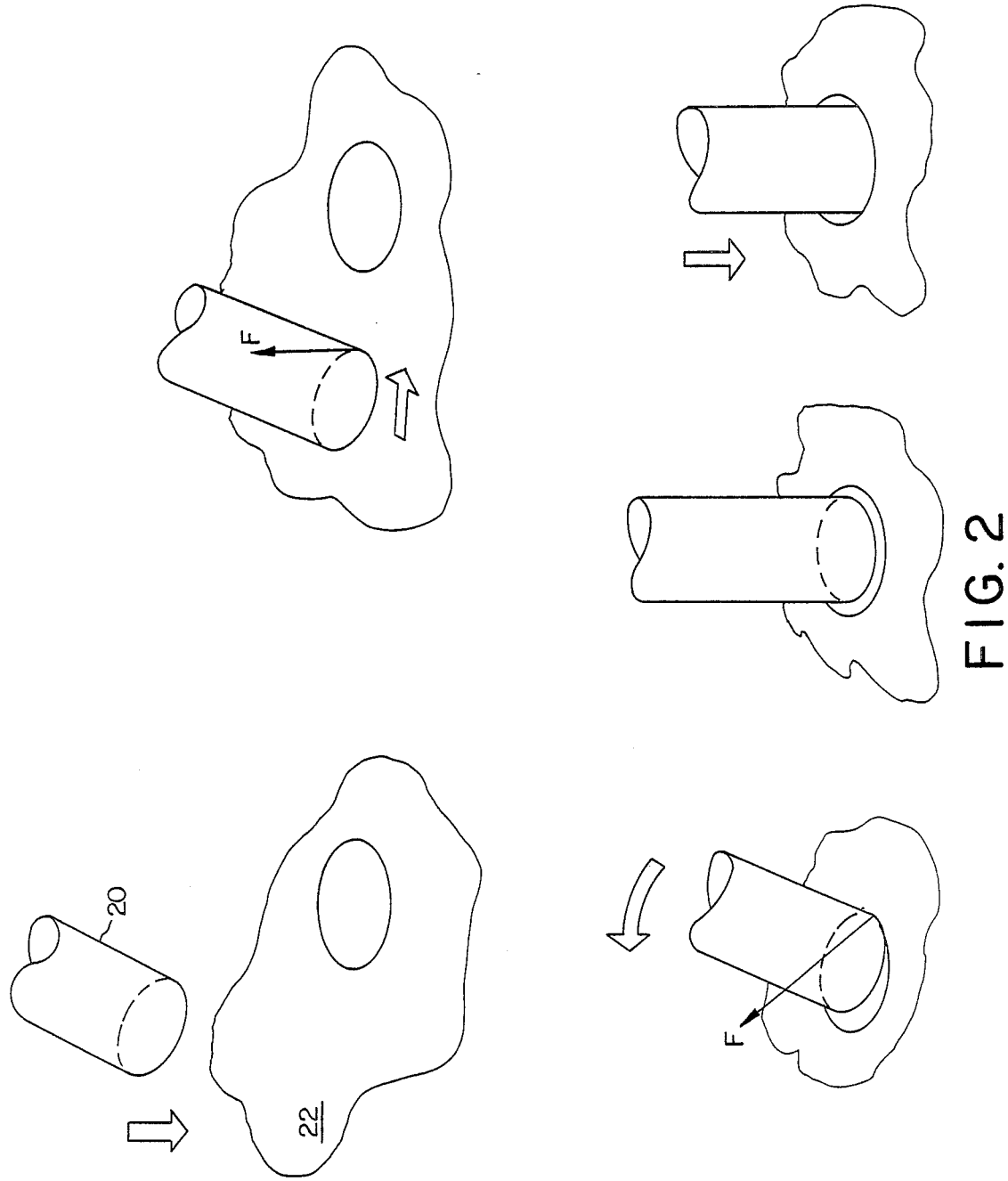
FIG. 2 is a representative solution of force control.

In a representative solution referring to FIG. 2 a peg 20 is first lowered onto a workpiece 22 until an interactive force between the peg 20 and workpiece 22 informs the control system (FIG. 4) that contact has been established. The peg is moved towards the hole until one edge enters. By interpreting the complex forces generated at the point of contact, or by heuristic means, the peg is correctly aligned and then inserted.

All manipulators will have finite response time during which the force sensing system has to determine that an interactive force has been established, is increasing, and take appropriate action to arrest further movement of the arm. For the PUMA robot, for example, this response time is of the order of 28 ms which means that to limit overshoot to 0.005", a maximum speed of 0.18 in/sec is permissible.

Two solutions are available. On is to ensure that the manipulator is moving slowly enough so that the control system has time to stop the arm before damage occurs. The other is to build sufficient compliance into the end effector so that it can deform appreciably without causing damage. While either of these methods avoid the problem of component damage, neither has anything to commend if from an industrial point of view. Slowing down the robot to avoid rapid build up of contact force implies slow assembly and hence a lengthy cycle time while high compliance and deformation results in uncertainty as to the precise pose of the end effector.

Figure 3:
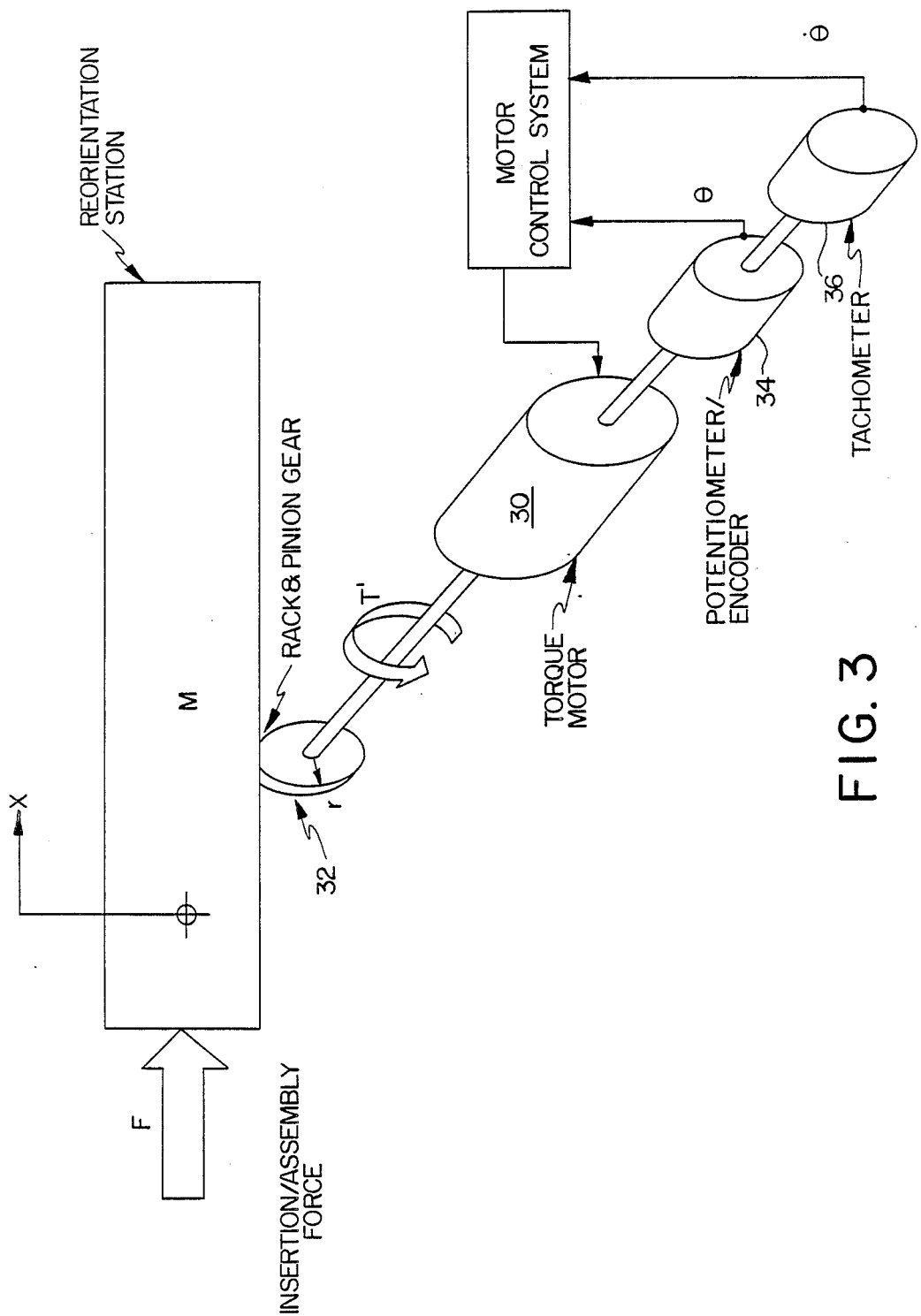
FIG. 3 is an illustration of adaptive compliance control of a reorientation station.
Figure 4:
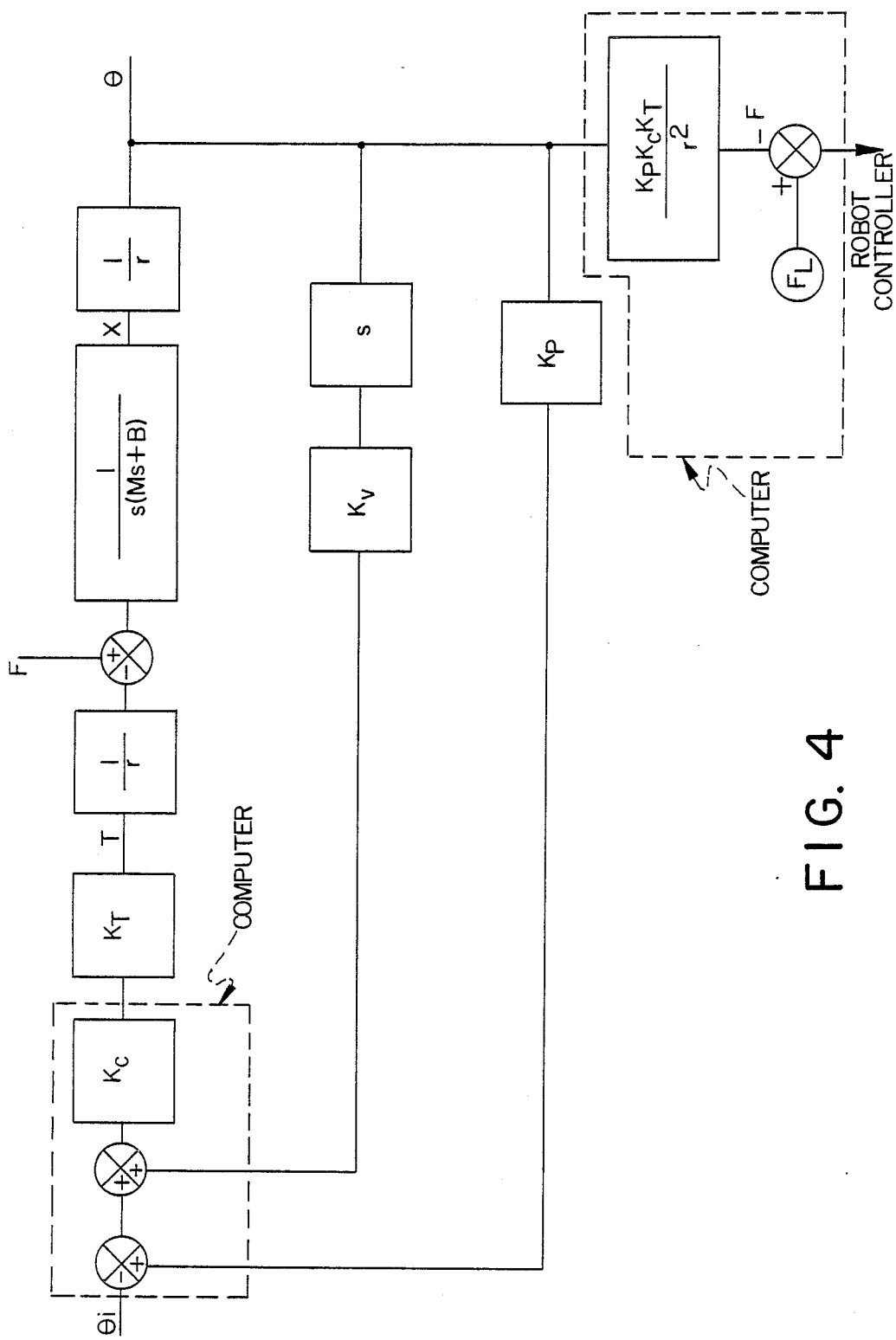
FIG. 4 is a schematic of a reorientation station control system.

Our system controls compliance in an adaptive manner. It is believed that with the present invention, speed of at least ten (10) times that of the prior art is achievable. Referring to FIG. 1 the reorientation station is oriented so that all insertions involve movement and force control in the vertical direction. FIG. 3 shows the reorientation station represented by the rigid mass M with the applied insertion force F due to contact between the robot held workpiece and the assembly and the damping deflection X. A motor 30 such as a Portescap 23D-216E is able to exert a reactive force on the mass by means of a rack and pinion gear 32. The angular position and velocity of the motor shaft are sensed by the potentiometer/encoder 34 such as a HP HEDS-5000 and tachometer 36 such as a Micro-Mo Series 1841. The control loop is closed around the motor as shown in FIG. 4, (programming diagram) and the system can be regarded as a position control system for the angular orientation of the motor shaft subject to a disturbing force F. Since the system is represented by a linear model the two inputs, angular position $\theta_o$ and force F considered separately. The transfer function relating F and x is simply the stiffness of the whole system and, setting $\theta_i = \theta$, can be seen to be $$\frac{x}{F} = \frac{1}{M(s)^2 + s[B + K_v K_c K_T/r^2] + [K_p K_c K_T/r^2]} \quad (1)$$

In the steady state the compliance therefore is $$\frac{x}{F} = \frac{r^2}{K_p K_c K_T} \quad (2)$$

This is programmable and variable since the forward path gain $K_c$ can be set to a range of desired values.

Now considering the same loop under position control we have $$\frac{\theta_o}{\theta_i} = \frac{K_c K_T/r^2}{Ms^2 + s[B + K_v K_c K_T/r^2] + [K_p K_c K_T/r^2]} \quad (3)$$

Obviously this system has zero steady state positional error for a step input.

M = mass of reorientation station
S = LaPlace operator
B = natural damping
$K_v$ = velocity feedback gain
$K_c$ = forward path gain $K_t$ = torque motor constant
$K_p$ = position feedback gain (torque motor shaft)
r = gear ratio
$\theta_o$ = actual angular position of torque motor shaft
$\theta_i$ = required angular position of torque motor shaft.

Since the system stiffness is known for any set value of $K_c$, and the angular position of the motor shaft is measured, the steady state force F applied to the orientation station may be calculated directly as:

$$F = K_p K_c K_T \theta_o / r \quad (4)$$

The inventive concept may be demonstrated using some representative numerical values and a simple assembly operation such as the one shown in FIG. 5. Here a workpiece 40 (held in a simple robot gripper not shown) approaches the orientation station 10. Assume a system has the various parts connected as shown in FIGS. 3 and 4 such that $$r = K_p = K_t = 1 \quad (5)$$

and that the maximum allowable contact force is 100 lbf and the robot control system sampling time is 0.020 seconds. Substituting (5) into (4) gives $$\text{Contact force} = F = K_c x \quad (6)$$

which upon differentiation with respect to time yields $$\frac{dF}{dt} = K_c \frac{dx}{dt} \quad (7)$$

where dx/dt may be interpreted as the velocity of the parts after impact. However, dF/dt may be calculated using the assumed data as $$\frac{dF}{dt} \approx \frac{\Delta F}{\Delta t} = \frac{100}{0.020} = 5000 \text{ lbf/sec}$$

This represents the earliest detectable rate of change of contact force by the robot controller. This finally results in:

$$K_c v' = 5000 \quad (8)$$

where v' is the approach velocity of the part. Equation 8 shows that to achieve a known rate of increase of force two alternatives are possible.
  a. Fix $K_c$ high and have v' low
  b. Fix $K_c$ low and have v' high.
since the product must be constant. Typical robot systems, which have essentially only structural compliance invariably fall into category a. above which is why the approach speed is low. For example if $K_c$ = 50,000 lbf/in then v' = 0.1 inches/second—a typical value.

In the proposed scheme $K_c$ is a variable in a computer program and hence may be varied. Setting $K_c$ = 2500 lbf/in for example results in an approach speed of 2.0 inches/second representing a 20 times increase in operating speed.

A general assembly operation may be represented by FIGS. 5a-5d. In 5a the value of $K_c$ would be of the order of 2500 lbf/in allowing a high speed approach of the part at 2.0 inches/second. If the robot controller is controlled such that the maximum allowable contact force $F_L$ is, say, 250 lbf then both parts will move downwards, 5b, while the contact force increases from 0 (just before impact) to the allowed maximum of 250 lbf. The stiffness of the system $K_c$ may be increased by computer control during the downward movement. Equation 6 shows that the deflection from the datum position (which is known to the robot controller) is:

$$x = F/k_c = 250/2500 = 0.1 \text{ inches.}$$

Figure 5B:
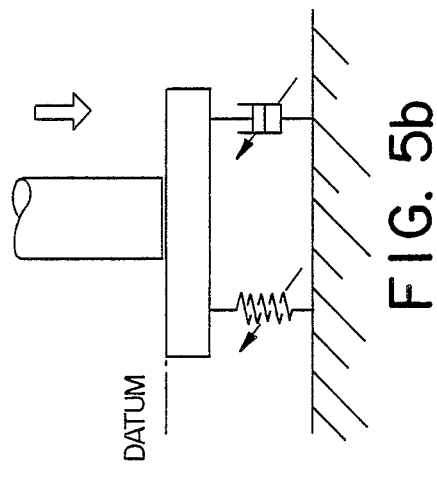
FIG. 5 is schematic of an adaptive compliance loading scheme.
Figure 5D:
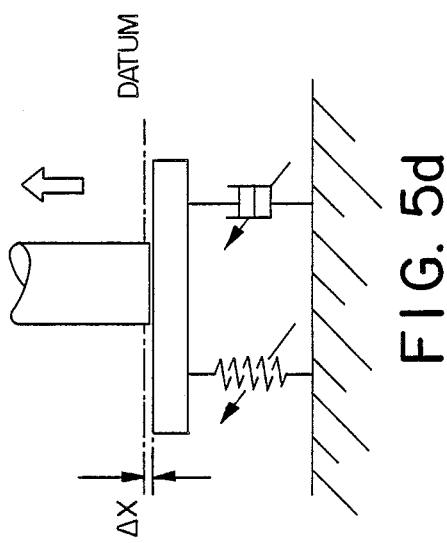
Figure 5A:
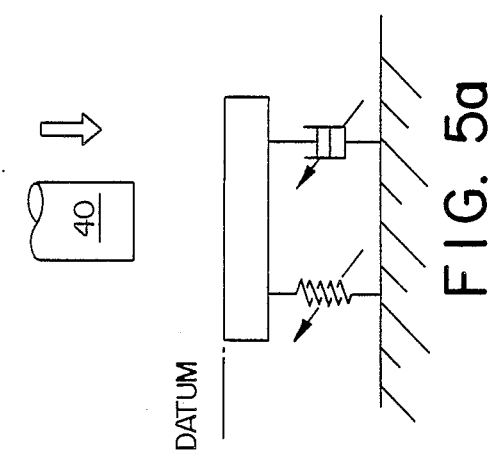
Figure 5C:
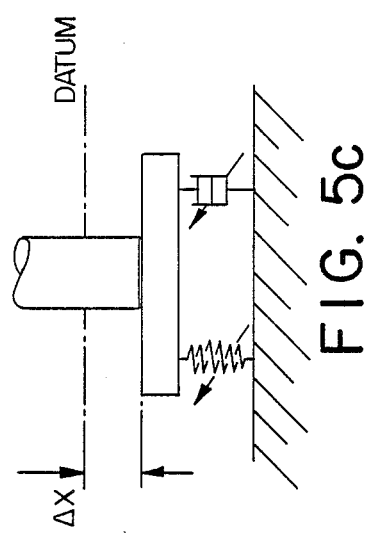

At this point both parts have been assembled and are at rest—FIG. 5c, however an unacceptably large deviation from the datum position has occurred. Now, if the robot control system is still programmed to maintain the contact force and the stiffness of the system $K_c$ is increased under computer control, equation 6 shows that if F is constant $K_c$ increases then x must decrease. In practice, as the computer increases $K_c$ the robot controller will retract the workpiece, followed by the reorientation station so as to move both of them towards the datum position—FIG. 5d. To return both components to the datumposition would require x→0 hence $K_c$→∞ which is impractical. However an acceptable value may be assigned to x, say 0.001" giving a final value of $K_c$ of $25.10^4$ lbf/inch.

In this way the initially low stiffness system is able to control the contact force due to the extended time interval over which this force is allowed to build up. The associated large deflections that result from this strategy are then reduced by increasing the stiffness of the system, returning both workpiece and orientation station towards the datum position.

Figure 6:
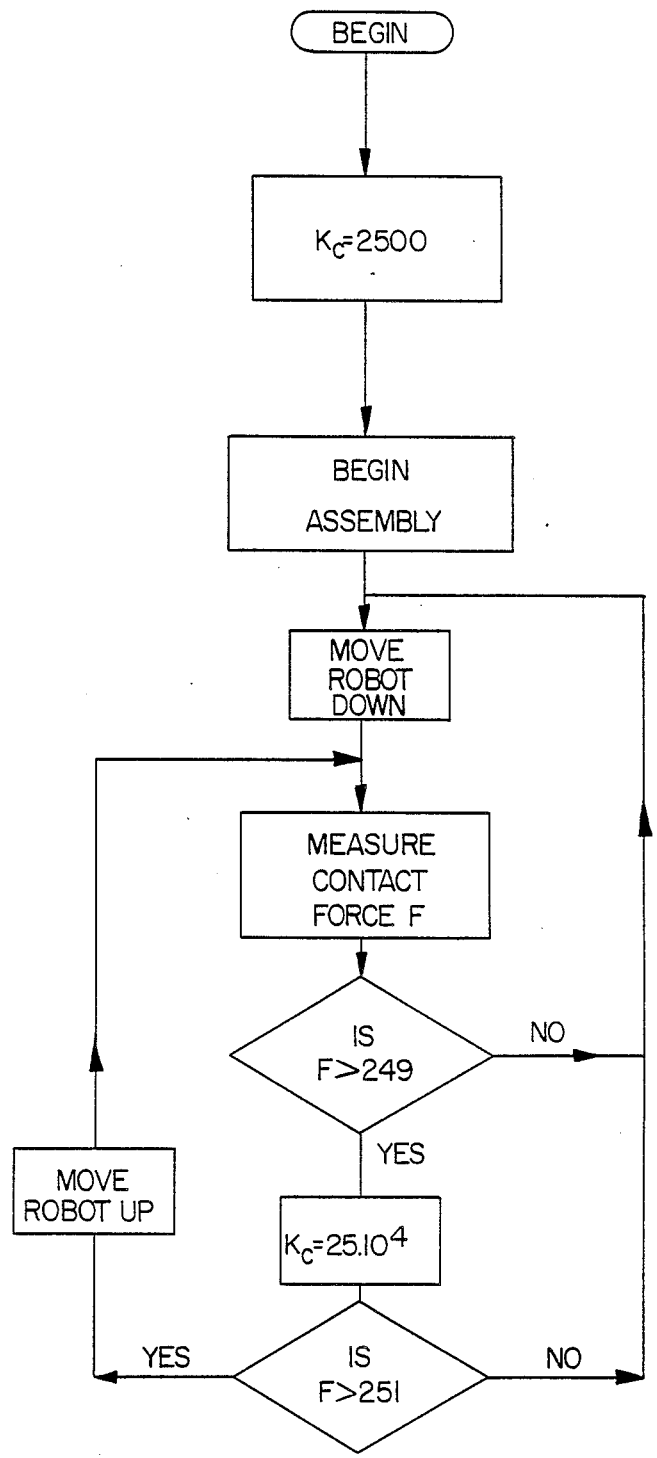
FIG. 6 is an algorithm flow chart.

To implement the control algorithm outlined above, only a simple microcomputer such as an Apple IIc or IBM PC is required. The algorithm would reside within an assembly language program and would be general in nature. A suitable program flow diagram is given in FIG. 6.

For a particular assembly operation where two parts are connected together, some consideration has to be given to the value of the maximum interaction force allowed during the assembly procedure. This figure will obviously depend upon the strength of the two parts. The present invention, however, effectively decouples the interactive force from the assembly time thereby making rapid assembly possible without subjecting either of the parts to a force greater than that due to slower conventional assembly techniques.

Having described my invention what is claimed is:

1. An adaptive compliance control system wherein workpieces are joined to one another on a reorientation station to form a product which comprises:
  a reorientation station adapted to receive a workpiece, said reorientation station deflectable from a first position to a second position the amount of deflection based on the interactive force between the workpiece and the reorientation station;
  robot means to move the workpiece and to place the workpiece into contacting engagement with the reorientation station;
  means to control the stiffness between the reorientation station and the workpiece which includes:
    means to sense the interactive force between the reorientation station and the workpiece;
    means to increase the stiffness while the reorientation station and the workpiece move from the first to the second position; and
  means to move the reorientation station and the workpiece to a third known position wherein the interactive force has exceeded a preset force value.

2. The control system of claim 1 which comprises:
means to stop the movement of the workpiece and the reorientation station when said preset force occurs.

3. The control system of claim 1 which includes:
means to move at least two workpieces and to place the workpieces sequentially into contacting engagement with the reorientation station or each other.

4. A method for assembling workpieces to form a product wherein the product is formed on a reorientation station which includes:
moving a workpiece toward the reorientation station;
contacting the reorientation station with the workpiece;
establishing a preset interactive force allowable between the reorientation station and the workpiece;
sensing the actual interactive force between the reorientation station and the workpiece;
increasing the stiffness between the reorientation station and the workpiece as the workpiece and the reorientation station move from a first position to a second position where the movement of the reorientation station and workpiece cease and
moving subsequently the reorientation station and the workpiece to a third known position, while maintaining the stiffness between them at a level greater than the level of the stiffness between them when at the second position whereby the location of the workpiece in relation to the reorientation station is known wherein the actual force has exceeded the preset force.

5. The method of claim 4 which includes:
stopping the movement of the workpiece and the reorientation station when said preset force is reached.

* * * * *